US012784270B2

(12) United States Patent
Yamamoto

(10) Patent No.: US 12,784,270 B2
(45) Date of Patent: Nov. 3, 2026

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Shinji Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 18/643,349

(22) Filed: Apr. 23, 2024

(65) Prior Publication Data

US 2024/0362819 A1 Oct. 31, 2024

(30) Foreign Application Priority Data

Apr. 25, 2023 (JP) ................................ 2023-071680

(51) Int. Cl.
*G06T 7/73* (2017.01)
*G06T 7/11* (2017.01)
(Continued)

(52) U.S. Cl.
CPC .................. *G06T 7/74* (2017.01); *G06T 7/11* (2017.01); *G06T 7/50* (2017.01); *G06V 10/242* (2022.01);
(Continued)

(58) Field of Classification Search
CPC ..... G06T 7/74; G06T 7/11; G06T 7/50; G06T 2207/20081; G06T 2207/30196;
(Continued)

(56) References Cited

U.S. PATENT DOCUMENTS 11,348,279 B1 * 5/2022 Akbas .................. A61B 5/1038
11,776,147 B2 * 10/2023 Bleicher ................ H04N 23/64 345/423
(Continued)

FOREIGN PATENT DOCUMENTS

JP 2019121045 A 7/2019
JP 2022131397 A 9/2022

OTHER PUBLICATIONS

Wang, Guan'an, et al. "High-order information matters: Learning relation and topology for occluded person re-identification." Proceedings of the IEEE/CVF conference on computer vision and pattern recognition. 2020. (Year: 2020).*
(Continued)

*Primary Examiner* — Gregory A Morse
*Assistant Examiner* — Ronde Lee Miller
(74) *Attorney, Agent, or Firm* — Canon U.S.A., Inc. IP Division

(57) ABSTRACT

An image processing apparatus includes at least one processor, and a memory coupled to the at least one processor, the memory storing instructions that, when executed by the at least one processor, cause the at least one processor to detect a region of a human body from an image, generate, from the image, a first clipped image including the region of the human body and a second clipped image different from the first clipped image and including the region of the human body, detect joint points of the human body from the first clipped image to generate joint point information on the human body, convert the joint point information so as to have spatial information coincident with spatial information on the second clipped image, and estimate a posture of the human body based on the converted joint point information and the second clipped image.

15 Claims, 14 Drawing Sheets

(51) Int. Cl.

| | |
|---|---|
| ***G06T 7/50*** | (2017.01) |
| ***G06V 10/24*** | (2022.01) |
| ***G06V 20/52*** | (2022.01) |
| ***G06V 40/10*** | (2022.01) |

(52) U.S. Cl.
CPC .. *G06V 40/103* (2022.01); *G06T 2207/20081* (2013.01); *G06T 2207/30196* (2013.01)

(58) Field of Classification Search
CPC ...... G06T 7/73; G06V 10/242; G06V 40/103; G06V 20/52
See application file for complete search history.

(56) References Cited

U.S. PATENT DOCUMENTS

| | | | | |
|---|---|---|---|---|
| 12,094,159 | B1 * | 9/2024 | Akbas | G06V 40/10 |
| 2016/0247016 | A1 * | 8/2016 | Ehlers | G06V 40/28 |
| 2021/0407264 | A1 * | 12/2021 | Kawano | G06V 40/20 |
| 2022/0189123 | A1 * | 6/2022 | Jee | G06T 19/006 |
| 2022/0207904 | A1 * | 6/2022 | Uchiyama | G06V 10/40 |
| 2022/0277473 | A1 * | 9/2022 | Inoshita | G06T 7/70 |
| 2023/0196617 | A1 * | 6/2023 | Zheng | G06V 10/811<br>382/159 |
| 2023/0360238 | A1 * | 11/2023 | Alexander | G06T 7/12 |
| 2024/0071084 | A1 * | 2/2024 | Bu | G06N 3/0464 |
| 2025/0182528 | A1 * | 6/2025 | Kimura | G06V 10/751 |

OTHER PUBLICATIONS

Miao, Jiaxu, et al. "Pose-guided feature alignment for occluded person re-identification." Proceedings of the IEEE/CVF international conference on computer vision. 2019. (Year: 2019).*

He, Shuting, et al. "Region generation and assessment network for occluded person re-identification." IEEE transactions on information forensics and security 19 (2023): 120-132. (Year: 2023).*

Gao, Shang, et al. "Pose-guided visible part matching for occluded person reid." Proceedings of the IEEE/CVF conference on computer vision and pattern recognition. 2020. (Year: 2020).*

Ke, Qiuhong, et al. "Learning clip representations for skeleton-based 3D action recognition." IEEE Transactions on Image Processing 27.6 (2018): 2842-2855. (Year: 2018).*

Abhinav Gupta et al., From 3D Scene Geometry to Human Workspace, CVPR, 2011.

Soshi Shimada et al., HULC: 3D HUman Motion Capture with Pose Manifold SampLing and Dense Contact Guidance, arXiv:2205.05677v4 [cs.CV], Jul. 26, 2022.

* cited by examiner

FIG.8

| CHANNEL | BODY PART | WEIGHT | | | |
|---|---|---|---|---|---|
| | | 0° | 90° | 180° | 270° |
| 1 | NOSE | 0.5 | 0.5 | 0.5 | 0.5 |
| 2 | LEFT EYE | 0.25 | 0.25 | 0.25 | 0.25 |
| 3 | RIGHT EYE | 0.25 | 0.25 | 0.25 | 0.25 |
| 4 | LEFT EAR | 0.25 | 0.25 | 0.25 | 0.25 |
| 5 | RIGHT EAR | 0.25 | 0.25 | 0.25 | 0.25 |
| 6 | LEFT SHOULDER | 1.25 | 1.25 | 1.25 | 1.25 |
| 7 | RIGHT SHOULDER | 1.25 | 1.25 | 1.25 | 1.25 |
| 8 | LEFT ELBOW | 0.5 | 0.25 | 0.25 | 0.25 |
| 9 | RIGHT ELBOW | 0.5 | 0.25 | 0.25 | 0.25 |
| 10 | LEFT WRIST | 0.5 | 0.25 | 0.25 | 0.25 |
| 11 | RIGHT WRIST | 0.5 | 0.25 | 0.25 | 0.25 |
| 12 | LEFT WAIST | 1.25 | 1.25 | 1.25 | 1.25 |
| 13 | RIGHT WAIST | 1.25 | 1.25 | 1.25 | 1.25 |
| 14 | LEFT KNEE | 1.25 | 0.75 | 1.0 | 0.75 |
| 15 | RIGHT KNEE | 1.25 | 0.75 | 1.0 | 0.75 |
| 16 | LEFT ANKLE | 1.25 | 1.25 | 1.25 | 1.25 |
| 17 | RIGHT ANKLE | 1.25 | 1.25 | 1.25 | 1.25 |

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention particularly relates to an image processing apparatus, a method of controlling the image processing apparatus, and a storage medium suitably used to estimate a posture of a person.

Description of the Related Art

In recent years, a technique for estimating a posture of a person from a video image of a monitoring camera has been proposed, and such a technique is applied in a field of security for customers in stores and in a field of monitoring in a city. The technique for estimating the posture of the person is applied to, for example, a case of checking whether a store is at fault when a customer sues the store for an injury from a fall, and a case of notifying a security guard of a squatting or sleeping person at an automated teller machine (ATM) or the like.

Therefore, as the technique for estimating the posture, a method of detecting joint positions of a person in a video image and estimating the posture based on the joint positions has been proposed. Japanese Patent Application Laid-Open Publication No. 2022-131397 discusses a technique for estimating a posture of a person from an image and a joint point position image. Japanese Patent Application Laid-Open Publication No. 2019-121045 discusses a technique for rotating an input image so that a head portion of a human body is erect in a vertical direction to detect joint point positions, and then performing reverse rotation to recognize an action.

SUMMARY OF THE INVENTION

According to an aspect of the present invention, an image processing apparatus includes at least one processor, and a memory coupled to the at least one processor, the memory storing instructions that, when executed by the at least one processor, cause the at least one processor to detect a region of a human body from an image, generate, from the image, a first clipped image including the region of the human body and a second clipped image different from the first clipped image and including the region of the human body, detect joint points of the human body from the first clipped image to generate joint point information on the human body, convert the joint point information so as to have spatial information coincident with spatial information on the second clipped image, and estimate a posture of the human body based on the converted joint point information and the second clipped image.

Further features of the present invention will become apparent from the following description of embodiments with reference to the attached drawings.

BRIEF DESCRIPTION OF THE DRAWINGS

FIG. 8 is a table illustrating an example of weight information applied to the joint point likelihood map.

DESCRIPTION OF THE EMBODIMENTS

The present invention is described in detail below based on embodiments with reference to the accompanying drawings. Note that configurations described in the following embodiments are merely illustrative, and the present invention is not limited to the illustrated configurations.

Figure 1:
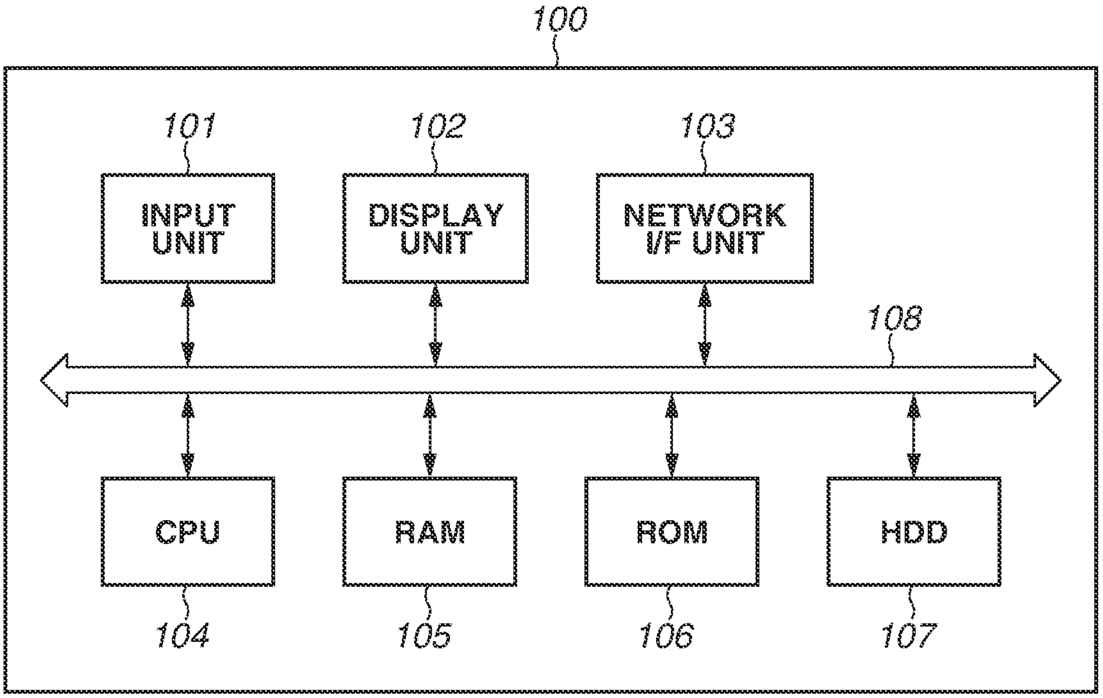
FIG. 1 is a block diagram illustrating a hardware configuration example of an image processing apparatus.

FIG. 1 is a block diagram illustrating a hardware configuration example of an image processing apparatus 100 according to a first embodiment.

The image processing apparatus 100 includes an input unit 101, a display unit 102, a network interface (I/F) unit 103, a central processing unit (CPU) 104, a random access memory (RAM) 105, a read only memory (ROM) 106, a hard disk drive (HDD) 107, and a data bus 108.

The CPU 104 reads a control computer program stored in the ROM 106 and loads the control computer program into the RAM 105, and performs various kinds of control processing. The RAM 105 is used as a temporary storage area for programs to be executed by the CPU 104, a work memory, or the like. The network I/F unit 103 is an interface for transmitting and receiving various kinds of information to and from another apparatus via a network. The HDD 107 stores image data, setting parameters, various kinds of programs, and the like. The image data and the like received from an external apparatus via the network I/F unit 103 are transmitted to and received from the CPU 104, the RAM 105, and the ROM 106 via the data bus 108.

When the CPU 104 executes an image processing program stored in the ROM 106 or the HDD 107, image processing is implemented on the image data. The HDD 107 can receive data from an external apparatus via the network I/F unit 103.

The input unit 101 includes, for example, a keyboard, a mouse, and a touch panel. The display unit 102 includes a display device such as a liquid crystal display. The input unit 101 and the display unit 102 are also connected to the data bus 108.

Figure 2:
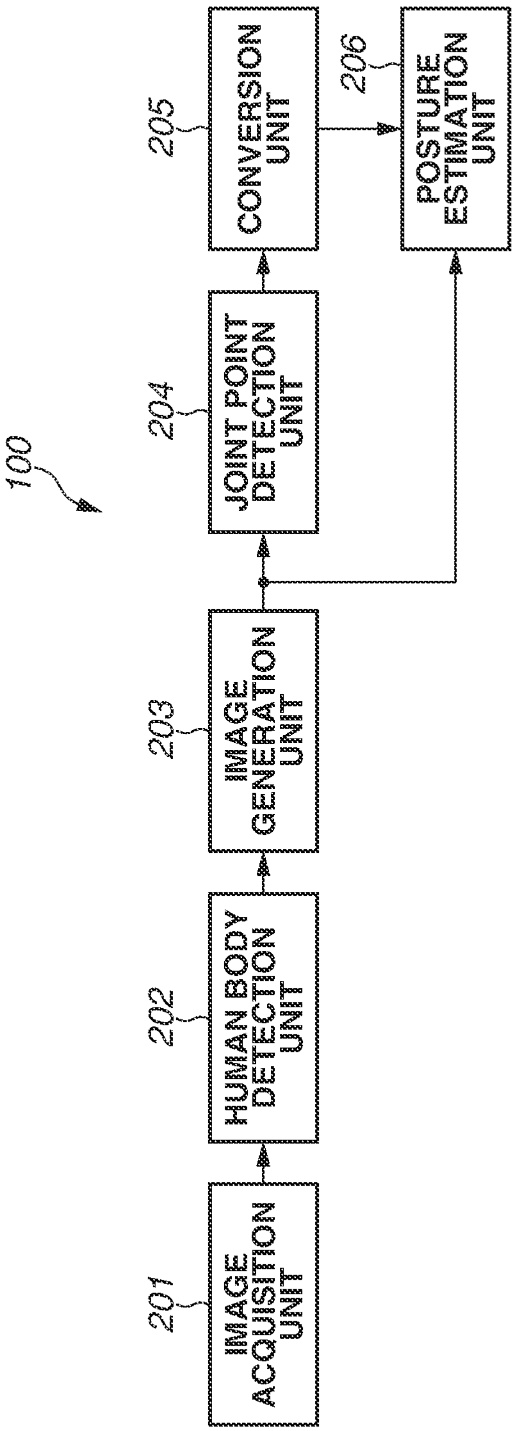
FIG. 2 is a block diagram illustrating a functional configuration example of an image processing apparatus according to a first embodiment.

FIG. 2 is a block diagram illustrating a functional configuration example of the image processing apparatus 100 according to the present embodiment. The image processing apparatus 100 includes an image acquisition unit 201, a human body detection unit 202, an image generation unit 203, a joint point detection unit 204, a conversion unit 205, and a posture estimation unit 206.

The image acquisition unit 201 acquires an image. The image to be acquired may be an image captured by a network camera or the like, an image recorded in the HDD 107 or the like, or an image received by the network I/F unit 103 via a network such as the Internet. The image acquired by the image acquisition unit 201 is transmitted to the human body detection unit 202.

The human body detection unit 202 detects a human body from the image acquired by the image acquisition unit 201, and generates a list of human body detection results. Each of the human body detection results includes information on a visible detection frame (center position and size) including a visible region of a human body, information on an invisible detection frame (center position and size) including an estimated invisible region of the human body in addition to the visible region, a detection score indicating detection reliability, and an image rotation amount.

Figure 3:
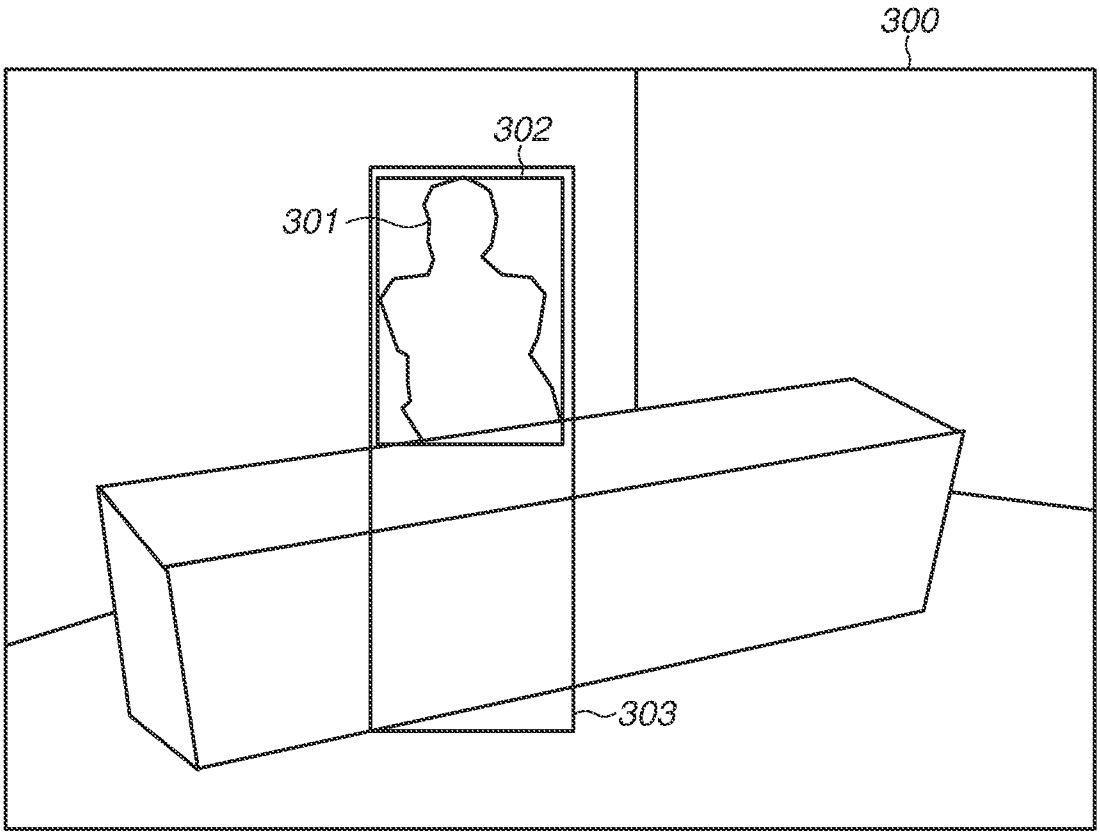
FIG. 3 is a diagram illustrating an example of a human body detection result.

FIG. 3 is a diagram illustrating an example of the human body detection result. A person 301 is included in an image 300, and a visible detection frame 302 and an invisible detection frame 303 are obtained. A lower half of the body of the person 301 is hidden by a shelf. Thus, a lower end of the visible detection frame 302 is at a position of the waist of the person 301. In contrast, a lower end of the invisible detection frame 303 is at an estimated position of a foot of the person 301. The human body detection unit 202 generates rotated images by rotating the image by zero degrees, 90 degrees, 180 degrees, and 270 degrees, and detects a human body from each of the rotated images, thereby generating the list of human body detection results. In the present embodiment, the human body detection unit 202 generates the rotated images rotated in units of 90 degrees; however, the human body detection unit 202 may generate rotated images rotated in units of 45 degrees or 30 degrees. In other words, a rotation amount and a rotation direction are not limited to a specific amount and a specific direction, and the image can be rotated by various rotation amounts.

The human body can be detected using a method discussed in J. Redmon, "You Only Look Once: Unified, Real-Time Object Detection", CVPR2015. All the acquired human body detection results are returned to coordinates on an original image by reverse rotation based on the respective image rotation amounts. Further, to identify the image rotation amount of the image from which the human body detection result is obtained, each of the human body detection results also includes information on the image rotation amount. Finally, an overlapping rate of the visible detection frame in a pair of the human body detection results is determined. In a case where the pair has the overlapping rate greater than or equal to a predetermined value, the human body detection result having the higher detection score of the pair is left as the human body detection result, and the other human body detection result of the pair is removed from the list of human body detection results. The list of human body detection results acquired by the human body detection unit 202 is transmitted together with the image to the image generation unit 203.

The image generation unit 203 generates a clipped image for joint point detection, a clipped image for posture estimation, and image generation information from the image and the list of human body detection results. First, the image generation unit 203 generates the clipped image for joint point detection of each person, based on each of the human body detection results. As a specific procedure, the image and the visible detection frame are rotated based on the image rotation amount included in the corresponding human body detection result. Then, the visible detection frame is converted into a clip region for joint point detection, based on the following formulas (1) to (5).

[Formulas 1 to 5]

$$cx = ltx' + \text{width}' * 0.5 \tag{1}$$

$$cy = lty' + \text{height}' * 0.5 \tag{2}$$

$$\text{unit} = \max\left(\frac{\text{width}'}{3}, \frac{\text{height}'}{4}\right) * 1.25 \tag{3}$$

$$\text{width} = \text{unit} * 3 \tag{4}$$

$$\text{height} = \text{unit} * 4 \tag{5}$$

In the formulas, ltx', lty', width', and height' respectively indicate an x coordinate of an upper-left corner, a y coordinate of the upper-left corner, a width, and a height of the visible detection frame. In the formulas, cx, cy, width, and height respectively indicate a center coordinate in an X direction, a center coordinate in a Y direction, a width, and a height of a rectangle that is the clip region for joint point detection. An image is clipped from the rotated image based on the clip region for joint point detection to be used as the clipped image for joint point detection.

The image generation unit 203 also generates the clipped image for posture estimation of each person, based on each of the human body detection results. As a specific procedure, first, the visible detection frame and the invisible detection frame included in each of the human body detection results are compared to see if the visible detection frame and the invisible detection frame are different in width or height by a predetermined value or more. In a case where the visible detection frame and the invisible detection frame are different in width or height by the predetermined value or more, it is determined that the human body is hidden. Otherwise, it is determined that the human body is not hidden. In a case where it is determined that the human body is hidden in the determination, the invisible detection frame is set as a selected detection frame. In a case where it is determined that the human body is not hidden, the visible detection frame is set as the selected detection frame. Then, the selected detection frame is converted into a clip region for posture estimation based on the following formulas (6) to (10).

[Formulas 6 to 10]

$$cx_{pose} = ltx'' + \text{width}'' * 0.5 \tag{6}$$

-continued $$cx_{pose} = lty'' + \text{height}'' * 0.5 \quad (7)$$

$$\text{unit}_{pose} = \max(\text{width}'', \text{height}'') * 2 \quad (8)$$

$$\text{width}_{pose} = \text{unit}_{pose} \quad (9)$$

$$\text{height}_{pose} = \text{unit}_{pose} \quad (10)$$

In the formulas, ltx", lty", width", and height" respectively indicate an x coordinate of an upper-left corner, a y coordinate of the upper-left corner, a width, and a height of the selected detection frame. In the formulas, $cx_{pose}$, $cy_{pose}$, $\text{width}_{pose}$, and $\text{height}_{pose}$ respectively indicate a center coordinate in the X direction, a center coordinate in the Y direction, a width, and a height of a rectangle that is the clip region for posture estimation. An image is clipped based on the clip region for posture estimation to be used as the clipped image for posture estimation.

The image generation unit 203 performs the above-described processing on each of the human body detection results, transmits the clipped image for joint point detection to the joint point detection unit 204, and transmits the clipped image for posture estimation to the posture estimation unit 206. Further, the image generation unit 203 transmits information on a size of the original image, the image rotation amount, the clip region for joint point detection, and the clip region for posture estimation as the image generation information to the conversion unit 205.

Figure 4:
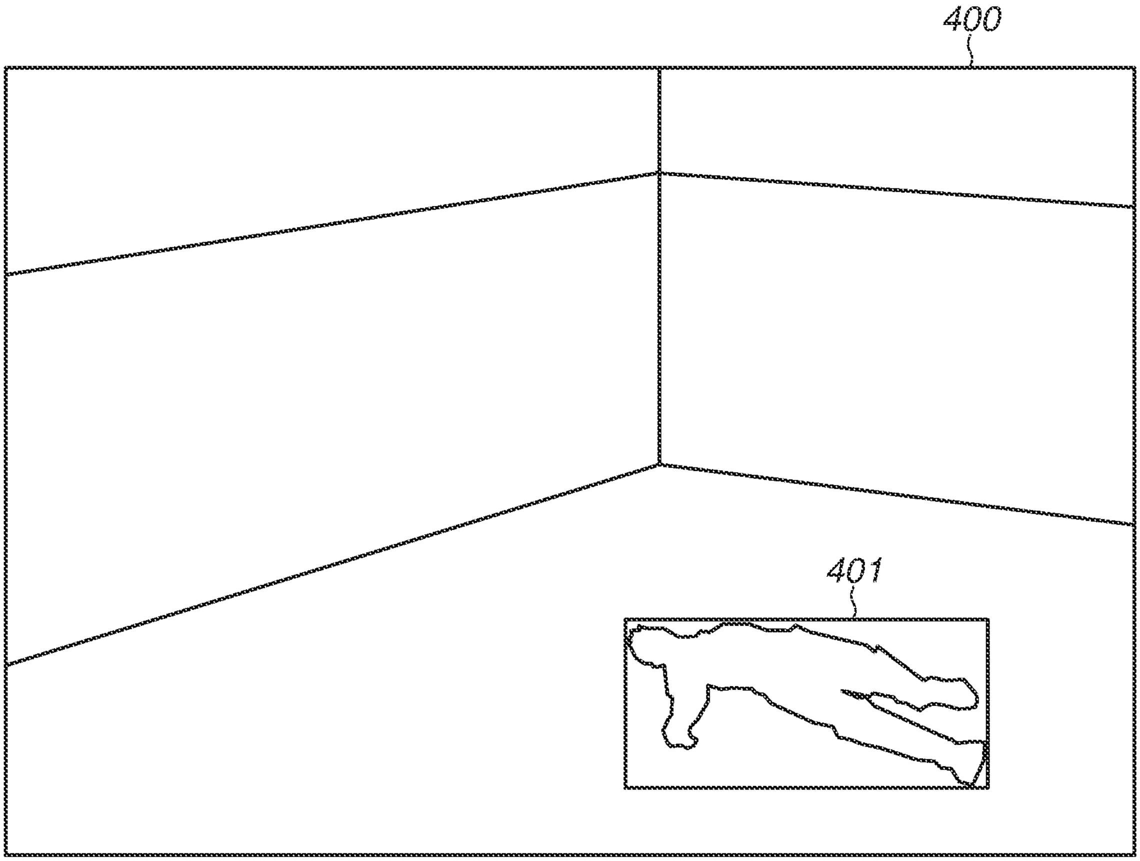
FIG. 4 is a diagram illustrating an example of a human body detection result with a person in a fallen-down posture.
Figure 5A:
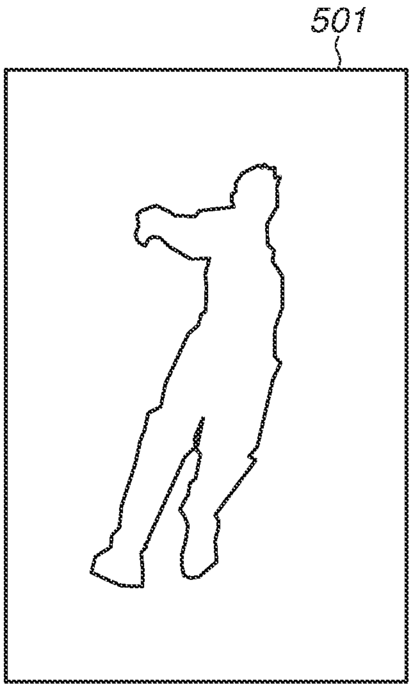
FIGS. 5A and 5B are diagrams each illustrating an example of an image clipped based on the human body detection result.
Figure 5B:
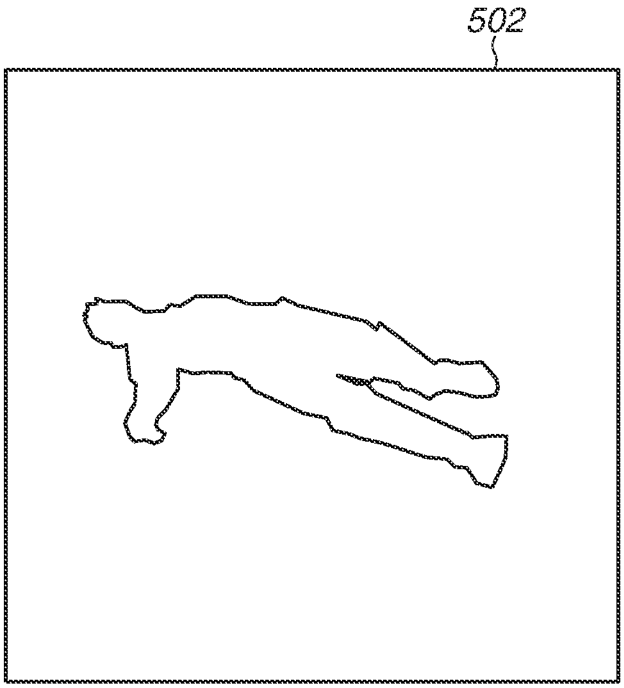

FIG. 4 is a diagram illustrating an example of the human body detection result with a person in a fallen-down posture, and FIGS. 5A and 5B are diagrams each illustrating an example of an image clipped based on a human body detection result 401 in FIG. 4. A person who has fallen down is included in an image 400 in FIG. 4, and the human body detection result 401 is acquired. At this time, it is assumed that the human body detection result 401 is acquired from the image 400 rotated 90 degrees in a clockwise direction.

FIG. 5A is a diagram illustrating an example of a clipped image 501 for joint point detection, acquired from the image 400 based on the human body detection result 401. The image illustrated in FIG. 5A is an image acquired by clipping the human body detection result 401 from the image 400 rotated 90 degrees in the clockwise direction, based on the clip region determined from the above-described formulas (1) to (5). FIG. 5B is a diagram illustrating an example of a clipped image 502 for posture estimation, acquired from the image 400 based on the human body detection result 401. The image illustrated in FIG. 5B is an image acquired by clipping the human body detection result 401 from the image 400, based on the clip region determined from the above-described formulas (6) to (10).

The joint point detection unit 204 generates a joint point likelihood map as joint point information based on the clipped image for joint point detection generated by the image generation unit 203. The joint point likelihood map is information representing position information on each joint point as a heat map. In the present embodiment, there are 17 joint points for the nose, both eyes, both ears, both shoulders, both elbows, both waists, both wrists, both knees, and both ankles. The joint point likelihood map can be generated by a method discussed in K. Sun, "Deep High-Resolution Representation Learning for Human Pose Estimation", CVPR2019, and is output at a size reduced by a certain scale factor from the input clipped image for joint point detection. The reduction scale factor is referred to as a joint point likelihood map scale factor. In the present embodiment, 17 joint points are defined as the joint points detected by the joint point detection unit 204; however, the joint points may be any part of the human body, and are not limited to the 17 joint points.

Figure 6A:
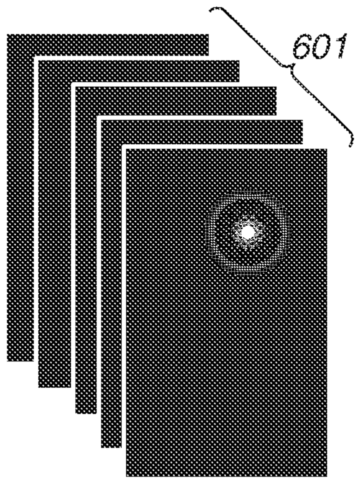
FIGS. 6A and 6B are diagrams each illustrating an example of a joint point detection result.
Figure 6B:
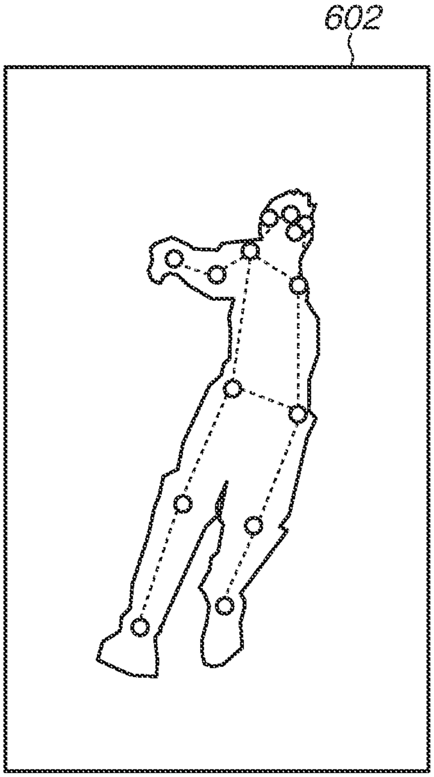

FIGS. 6A and 6B are diagrams each illustrating an example of a joint point detection result. FIG. 6A is a diagram illustrating an example of a joint point likelihood map 601. The joint point likelihood map 601 includes 17 heat maps, and each of the heat maps has a higher value at a position where likelihood that a corresponding joint point is present is higher. The joint point detection result of 17 joint points can be acquired by acquiring peak positions from the joint point likelihood map 601. FIG. 6B illustrates an example in which the joint point detection result is superimposed on the image. The joint point detection unit 204 integrates the joint point likelihood map 601 and the joint point likelihood map 601 scale factor into joint point likelihood map information 602, and transmits the joint point likelihood map information 602 to the conversion unit 205.

The conversion unit 205 generates a joint point likelihood map for posture estimation based on the image generation information and the joint point likelihood map information. More specifically, first, the joint point likelihood map generated by the joint point detection unit 204 is resized at an inverse scale factor of the joint point likelihood map scale factor. Next, the joint point likelihood map is reversely rotated with a center coordinate of the joint point likelihood map as a reference based on the image rotation amount included in the image generation information. Finally, margins are set on the top, bottom, left, and right of the joint point likelihood map based on a difference between the clip region for joint point detection and the clip region for posture estimation. At this time, likelihoods of margin regions are set to zero. Margin amounts to be set are determined as follows.

[Formulas 11 and 12]

$$\text{margin}_{left,right} = \frac{(\text{width}_{pose} - \text{width}_{keypoint})}{2} \quad (11)$$

$$\text{margin}_{top,bottom} = \frac{\text{height}_{pose} - \text{height}_{keypoint}}{2} \quad (12)$$

In the formulas, $\text{margin}_{left,right}$ indicates a margin amount applied on the left and right, and $\text{margin}_{top,bottom}$ indicates a margin amount applied on the top and bottom. In the formulas, $\text{width}_{keypoint}$ and $\text{height}_{keypoint}$ respectively indicate a width and a height of the clip region for joint point detection on the original image.

Figure 7A:
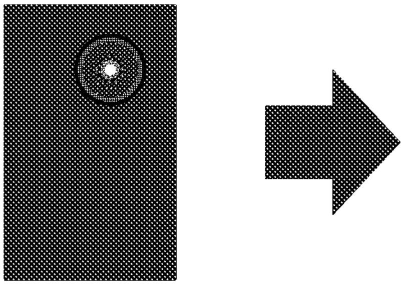
FIGS. 7A, 7B, and 7C are diagrams illustrating an example of a result of conversion processing into a joint point likelihood map for posture estimation.
Figure 7B:
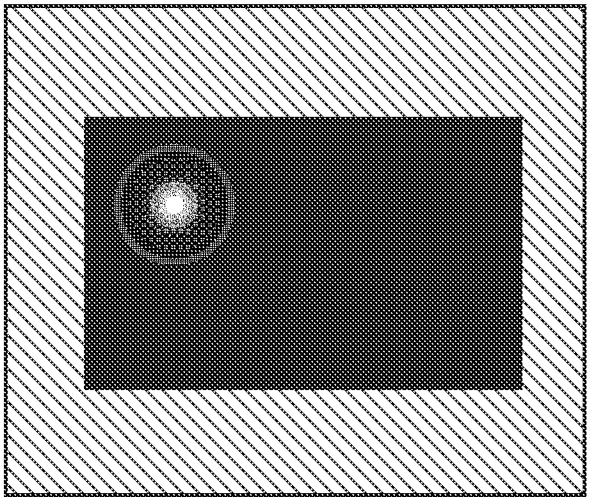
Figure 7C:
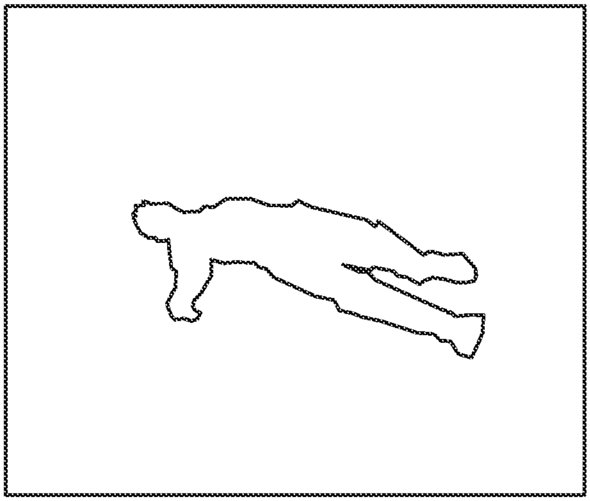

FIGS. 7A to 7C are diagrams illustrating an example of a result of conversion processing into the joint point likelihood map for posture estimation. FIGS. 7A to 7C respectively illustrate an example of the joint point likelihood map before conversion, an example of the joint point likelihood map after the conversion, and an example of the clipped image for posture estimation. As illustrated in FIG. 7B, spatial information on the joint point likelihood map after the conversion is coincident with spatial information on the clipped image for posture estimation by processing of resizing, rotation, and addition of the margins. In the example illustrated in FIGS. 7A to 7C, pieces of spatial information are made coincident with each other by three types of conversion processing of resizing, rotation, and addition of the margins; however, when the pieces of spatial information can be made coincident with each other by at least one of the three types of conversion processing, it is unnecessary to perform all of the three types of conversion processing.

Further, the conversion unit 205 assigns a weight to each of the joint points in the joint point likelihood map after the conversion. The weight is assigned to each of the joint points based on weight information for each of the joint points determined in advance based on the rotation amount. FIG. 8 illustrates an example of the weight information applied to the joint point likelihood map.

As illustrated in FIG. 8, the weight information includes weights at the image rotation amounts of zero degrees, 90 degrees, 180 degrees, and 270 degrees. The conversion unit 205 transmits the joint point likelihood map thus weighted as the joint point likelihood map for posture estimation to the posture estimation unit 206.

The posture estimation unit 206 outputs a posture estimation result based on the clipped image for posture estimation and the joint point likelihood map for posture estimation. The posture estimation result is output as score information in which a value is increased as likelihood that the person is taking a posture in posture classifications, such as “standing up”, “sitting down”, and “lying down”, is higher. Posture estimation processing is performed using a deep learning model.

Figure 9:
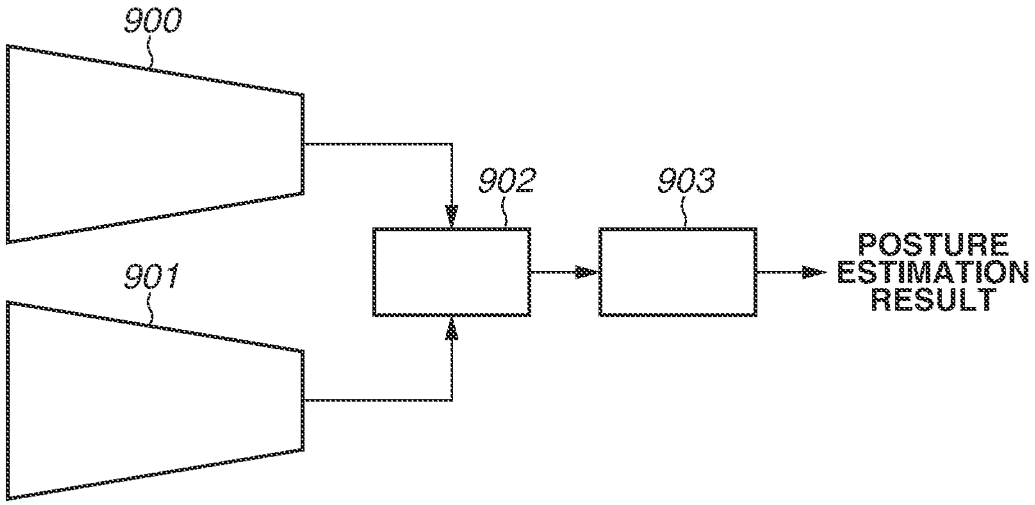
FIG. 9 is a diagram illustrating an example of a structure of a deep learning model for posture estimation.

FIG. 9 is a diagram illustrating an example of a structure of a deep learning model for posture estimation. The deep learning model includes a first feature extraction layer 900, a second feature extraction layer 901, a connected layer 902, and an identification layer 903. The first feature extraction layer 900 extracts a feature amount from the joint point likelihood map for posture estimation generated by the conversion unit 205. The second feature extraction layer 901 extracts a feature amount from the clipped image for posture estimation generated by the image generation unit 203. In particular, the deep learning model for posture estimation has a structure in which outputs of the first feature extraction layer 900 and the second feature extraction layer 901 are input to the identification layer 903 in a state where pieces of spatial information are coincident with each other by causing the size of each of the outputs of the first feature extraction layer 900 and the second feature extraction layer 901 to be a M×N dimensional numerical vector. The deep learning model for posture estimation has a structure in which the identification layer 903 outputs the posture estimation result based on a feature matrix connected in the connected layer 902.

Figure 10:
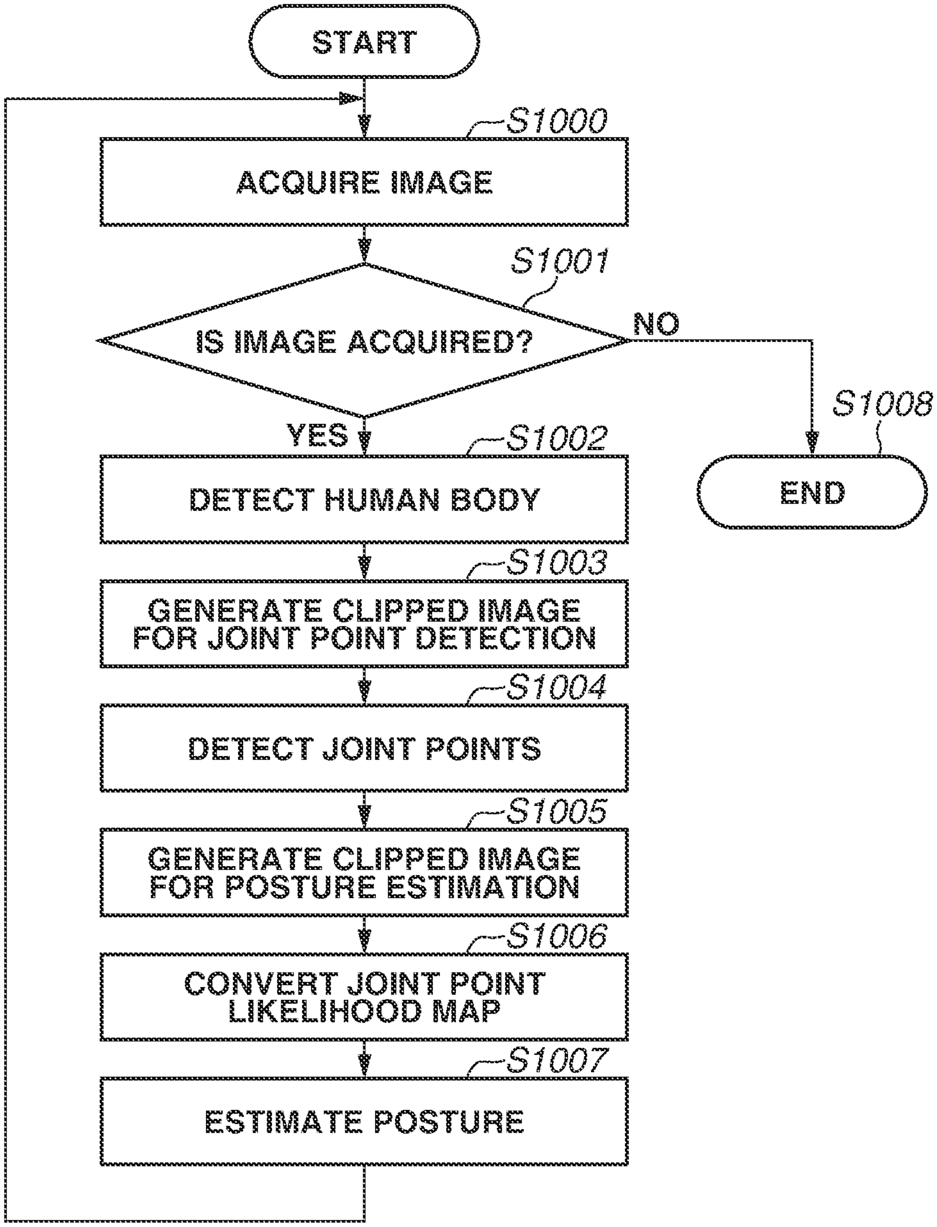
FIG. 10 is a flowchart illustrating an example of a processing procedure for estimating a posture according to the first embodiment.

Now, processing performed by the image processing apparatus 100 according to the present embodiment is described with reference to the flowchart in FIG. 10. FIG. 10 is a flowchart illustrating an example of a processing procedure for estimating a posture by the image processing apparatus 100 according to the present embodiment.

First, in step S1000, the image acquisition unit 201 performs image acquisition processing. Then, in step S1001, the image acquisition unit 201 determines whether an image has been acquired. In a case where a result of determination indicates that an image has not been acquired (NO in step S1001), the processing proceeds to step S1008. In step S1008, the processing ends. In contrast, in a case where the result of determination indicates that an image has been acquired (YES in step S1001), the processing proceeds to step S1002.

In step S1002, the human body detection unit 202 detects all persons in the acquired image, and generates a list of human body detection results. Then, in step S1003, the image generation unit 203 generates the clipped image for joint point detection from the image and the list of human body detection results. Subsequently, in step S1004, the joint point detection unit 204 performs joint point detection processing on the clipped image for joint point detection. In the processing, the joint point likelihood map is generated.

Then, in step S1005, the image generation unit 203 generates the clipped image for posture estimation from the image and the list of human body detection results. At this time, the image generation unit 203 also generates the image generation information. Then, in step S1006, the conversion unit 205 converts the joint point likelihood map generated in step S1004 into the joint point likelihood map for posture estimation using the image generation information generated in step S1005. Then, in step S1007, the posture estimation unit 206 performs the posture estimation processing using the clipped image for posture estimation and the joint point likelihood map. The processing then returns to step S1000, and is repeated.

A person can take various postures. Thus, there are cases where the positions of the joint points cannot be accurately detected, or where the posture cannot be accurately determined only from the positions of the joint points, depending on a posture. By the method discussed in Japanese Patent Application Laid-Open Publication No. 2022-131397, estimation accuracy of the posture decreases in a case where a camera is inclined or in a case where a person falls down. By the method discussed in Japanese Patent Application Laid-Open Publication No. 2019-121045, the positions of the joint points can be accurately estimated; however, postures that look alike from the positions of the joint points are not sufficiently distinguished, and estimation accuracy of the posture decreases in the case where a camera is inclined.

In contrast, according to the present embodiment, the joint point likelihood map generated from the clipped image for joint point detection is converted so as to have the spatial information corresponding to the spatial information on the clipped image for posture estimation by the processing of resizing, rotation, and addition of the margins. As a result, the detection results of the joint points and the posture of the person can be accurately associated with each other, which makes it possible to improve estimation accuracy of the posture of the person. Further, at the time of generating the clipped image for posture estimation, in a case where the visible detection frame and the invisible detection frame are different in width or height by the predetermined value or more in a comparison, the clipped image for posture estimation is generated based on the invisible detection frame wider than the visible detection frame. As a result, the posture can be estimated in consideration of important information such as information on a peripheral object. This makes it possible to estimate the posture with high accuracy.

The present embodiment discusses the method of calculating the clip region for joint point detection and the clip region for posture estimation by using the formulas (1) to (10); however, the calculation method is not limited thereto as long as a periphery of a person region can be clipped. Further, the present embodiment discusses the example in which the spatial information on the joint point likelihood map is made coincident with the spatial information on the clipped image for posture estimation by processing of resizing, rotation, and addition of the margins; however, another method may be used. More specifically, conversion that can make the spatial information on the joint point likelihood map coincident with the spatial information on the clipped image for posture estimation, for example, affine transformation may be used, but the method is not limited thereto.

The present embodiment discusses the example in which the score information having the value corresponding to each of the posture classifications is output as the posture estimation result. Alternatively, classification information indicating the most likely posture classification may be output as a label.

The posture estimation result is not limited thereto as long as the posture estimation result is information indicating the posture of the person.

A second embodiment discusses an example in which object detection or floor surface estimation is performed on an image, and an image generation condition and a conversion condition are controlled using object information and depth information. In the following description, description of parts same as the parts in the first embodiment is omitted, and only differences are described.

Figure 11:
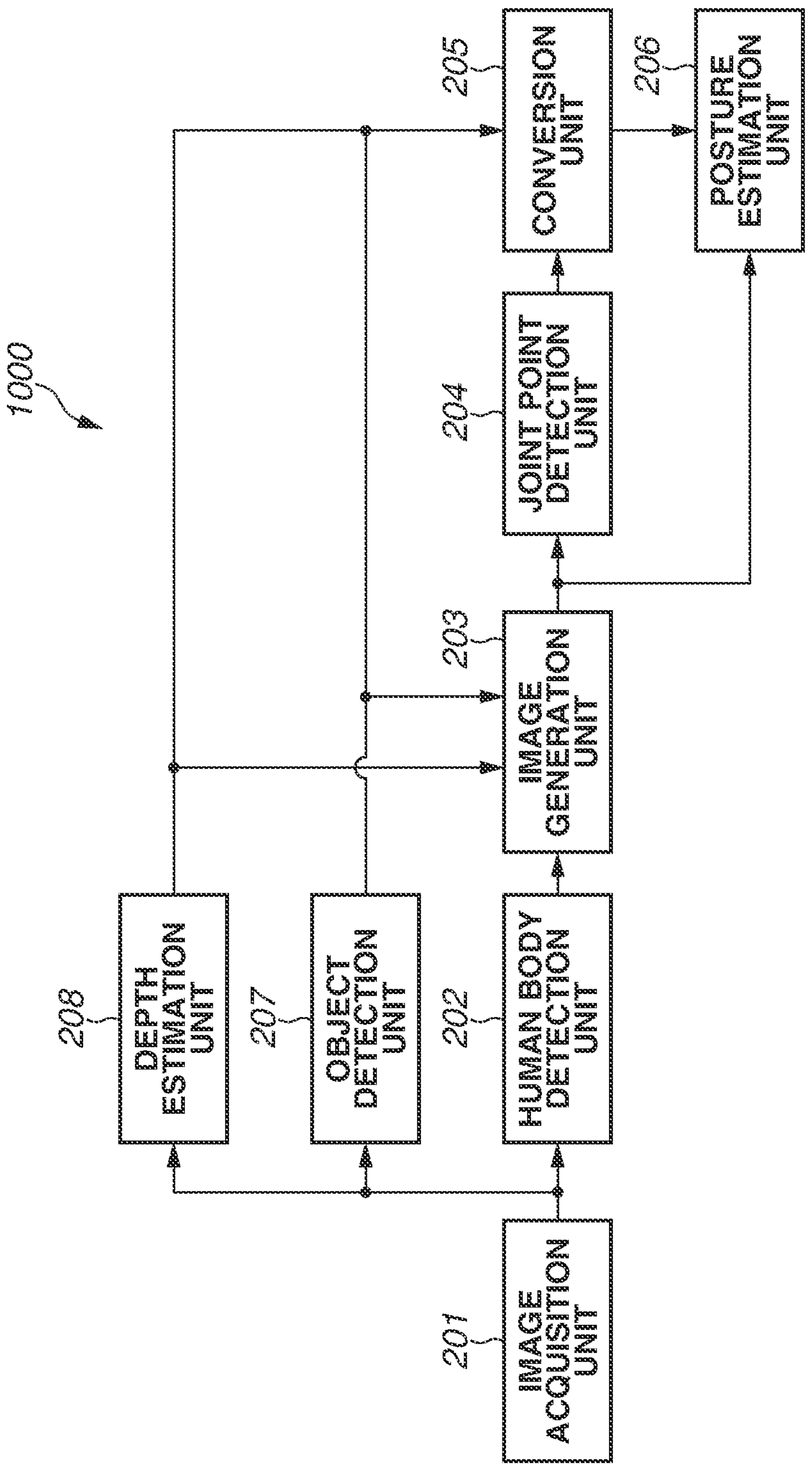
FIG. 11 is a block diagram illustrating a functional configuration example of an image processing apparatus according to a second embodiment.

FIG. 11 is a block diagram illustrating a functional configuration example of an image processing apparatus 1000 according to the present embodiment. In the present embodiment, an object detection unit 207 and a depth estimation unit 208 are further added to the configuration in FIG. 2 described in the first embodiment.

The object detection unit 207 detects an object within the image. The object refers to a chair, a desk, a shelf, and the like, and the technique discussed in J. Redmon, "You Only Look Once: Unified, Real-Time Object Detection", CVPR2015, is used for object detection. An object detection result includes a detection frame containing the object, and information on an object label indicating what the object is. The object detection unit 207 transmits the object detection result to the image generation unit 203 and the conversion unit 205.

The depth estimation unit 208 estimates depth information on an imaging environment from the image. The depth information refers to distance information from a camera to a subject that is represented as a depth map, and is data in a bitmap format in which each pixel is represented by a depth value. The depth can be estimated using a technique discussed in R. Ranftl, "Towards Robust Monocular Depth Estimation: Mixing Datasets for Zero-shot Cross-dataset Transfer", TPAMI 2020. The depth estimation unit 208 transmits the depth information to the image generation unit 203 and the conversion unit 205.

The image generation unit 203 performs the processing described in the first embodiment, and changes the clip region for posture estimation based on the human body detection results, the object detection result, and the depth information. First, the clip region for posture estimation is determined by the method described in the first embodiment. Next, the clip region for posture estimation with respect to each of the human body detection results is corrected so as to be horizontal to a floor surface depending on distortion of a lens and inclination of the camera. Finally, the clip region for posture estimation is corrected so as to include an object region relating to the person based on the object detection result.

A procedure for correcting the clip region for posture estimation so as to be horizontal to the floor surface is described. In a case where a difference between y coordinates at lower ends of the visible detection frame and the invisible detection frame of a target person is a predetermined value or more, it is determined that the target person is hidden. In a case where it is determined that the target person is hidden, correction of the clip region is not performed. In contrast, in a case where it is determined that the target person is not hidden, a depth map corresponding to a peripheral portion of the lower end of the visible detection frame is clipped from the depth map of the entire image to form a local depth map. When the local depth map is operated in an x-axis direction, and the depth value does not change, it is determined that the inclination is zero. In a case where the depth value gradually decreases, it is determined that the clip region for posture estimation is inclined toward the minus side. In a case where the depth value gradually increases, it is determined that the clip region for posture estimation is inclined toward the plus side. An inclination angle can be determined based on a change amount of the depth value. For example, in a case where the depth value increases by +8 degrees on average, the inclination angle is −15 degrees. In a case where the depth value increases by +16 degrees on average, the inclination angle is −30 degrees. As described above, it is determined that the inclination angle is large as the change amount is large.

Figure 12:
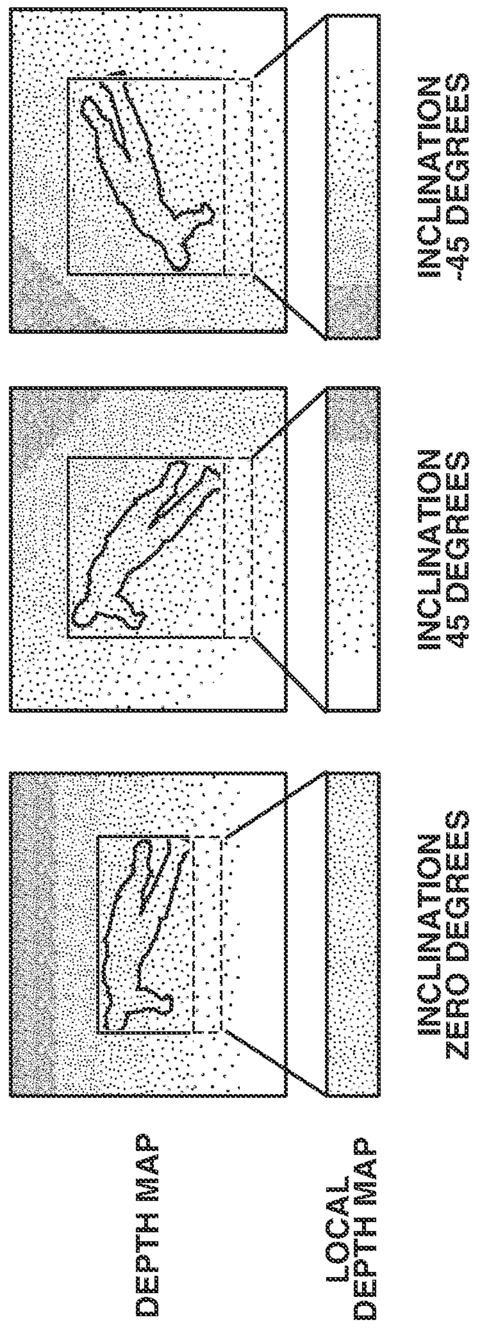
FIG. 12 is a diagram illustrating an example of a relationship between a depth map and an estimated value of an inclination angle.

FIG. 12 is a diagram illustrating an example of a relationship between the depth map and an estimated value of the inclination angle.

The clip region can be corrected by calculating a rotation amount based on the inclination angle determined using the local depth map, and performing resizing and rotation on the clip region so as to contain the original clip region.

The example in which the rotation amount of the clip region is calculated using the depth information is described above; however, the rotation amount may be calculated by another method. For example, the rotation amount due to the distortion of the lens may be directly measured from internal parameters of the camera to calculate the rotation amount of the clip region.

Alternatively, the inclination of the camera may be directly determined from external parameters of the camera, and the rotation amount of the clip region may be calculated by regarding the inclination of the camera as the inclination angle. As another method, a degree of distortion of the lens may be measured from edge information on the imaging environment to calculate the rotation amount of the clip region. Further, the floor surface may be specified by region division using machine learning, a degree of inclination may be determined from a shape of a floor surface region, and the rotation amount of the clip region may be calculated from the degree of inclination. As described above, the method of calculating the rotation amount is not limited to a specific method as long as the rotation amount at which the clip region becomes horizontal to the floor surface can be determined.

Subsequently, a procedure for correcting the clip region to include the object region relating to the person is described. First, object detection results each having the object detection frame overlapping the visible detection frame of the target person are listed up from among the object detection results. In a case where an object detection result having the object label coincident with a predetermined label is present among the listed-up object detection results, the clip region for posture estimation is corrected so that the object detection frame of the object detection result is also included in the clip region.

Figure 13:
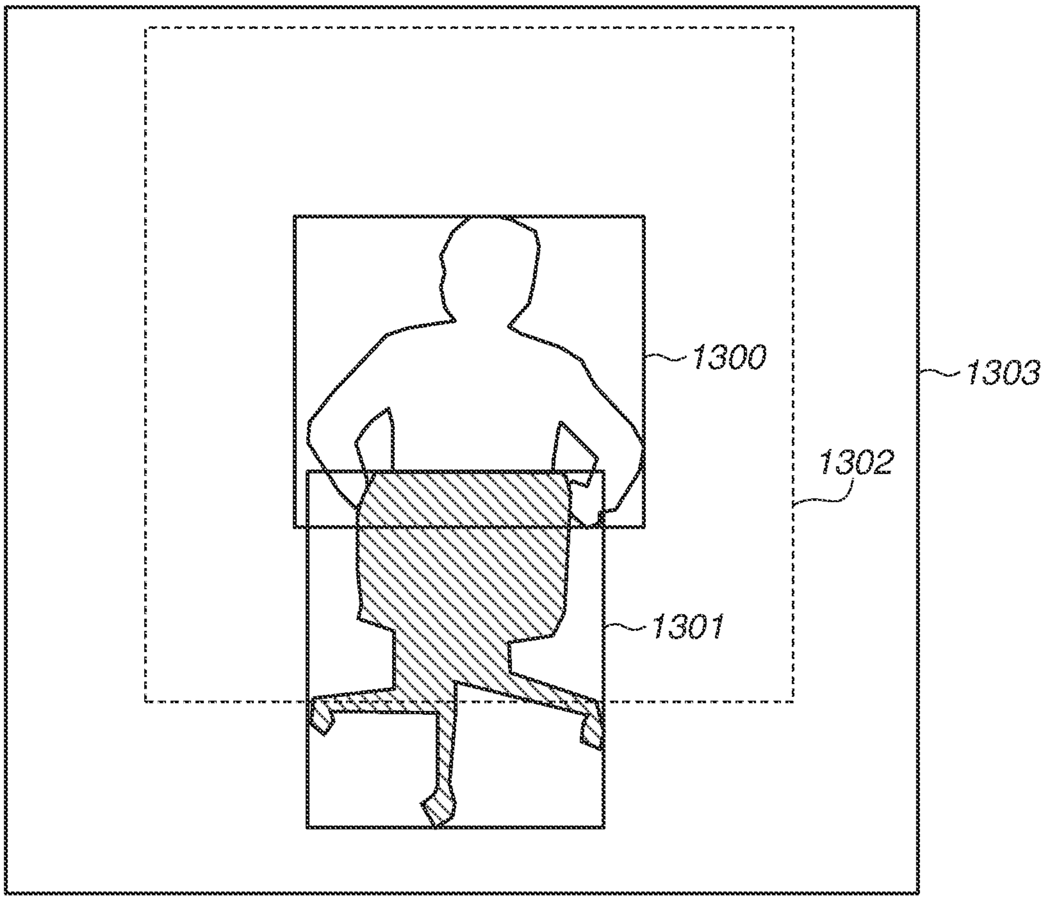
FIG. 13 is a diagram illustrating an example in which a clip region for posture estimation is corrected using an object detection result.

FIG. 13 is a diagram illustrating an example in which the clip region for posture estimation is corrected using the object detection result. In the example illustrated in FIG. 13, a person in the image is sitting on a chair, and a lower half of the body of the person is hidden by the chair. First, a clip region 1302 for posture estimation is calculated from a human body detection result 1300 by calculation using the formulas (6) to (10). In the present embodiment, correction is further performed using an object detection result 1301 to acquire a clip region 1303 for posture estimation including the object region. An image is clipped based on the clip region for posture estimation corrected by using the above-described procedure, to form the clipped image for posture estimation.

The conversion unit 205 generates the joint point likelihood map for posture estimation based on the image generation information, the joint point likelihood map information, and the depth information. First, processing equivalent to the processing in the first embodiment is performed to generate the joint point likelihood map for posture estimation. Next, based on the image generation information, person region depth information is generated by clipping depth information from the depth information on the entire image such that the spatial information thereon is coincident with the spatial information on the clipped image for posture estimation. Then, the clipped person region depth information and the joint point likelihood map for posture estimation are connected. At this time, the depth information may be connected as a new channel, or a value of a pixel of which the likelihood of the joint point is a certain value or more in each channel of the joint point likelihood map may be replaced with a corresponding value of the person region depth information, and values of the other pixels may be replaced with zero.

The example of directly replacing the value with the value of the depth information at the time of connecting the depth information to the joint point likelihood map is described; however, depth information on a background may be acquired in advance, and the value may be replaced with a distance to a background object by calculating a difference. Alternatively, by calculating a difference from depth information on a specific joint point, pseudo three-dimensional joint position information may be generated. As described above, the connection method is not limited to a specific method as long as the joint point likelihood map is converted into information about a three-dimensional space.

Figure 14:
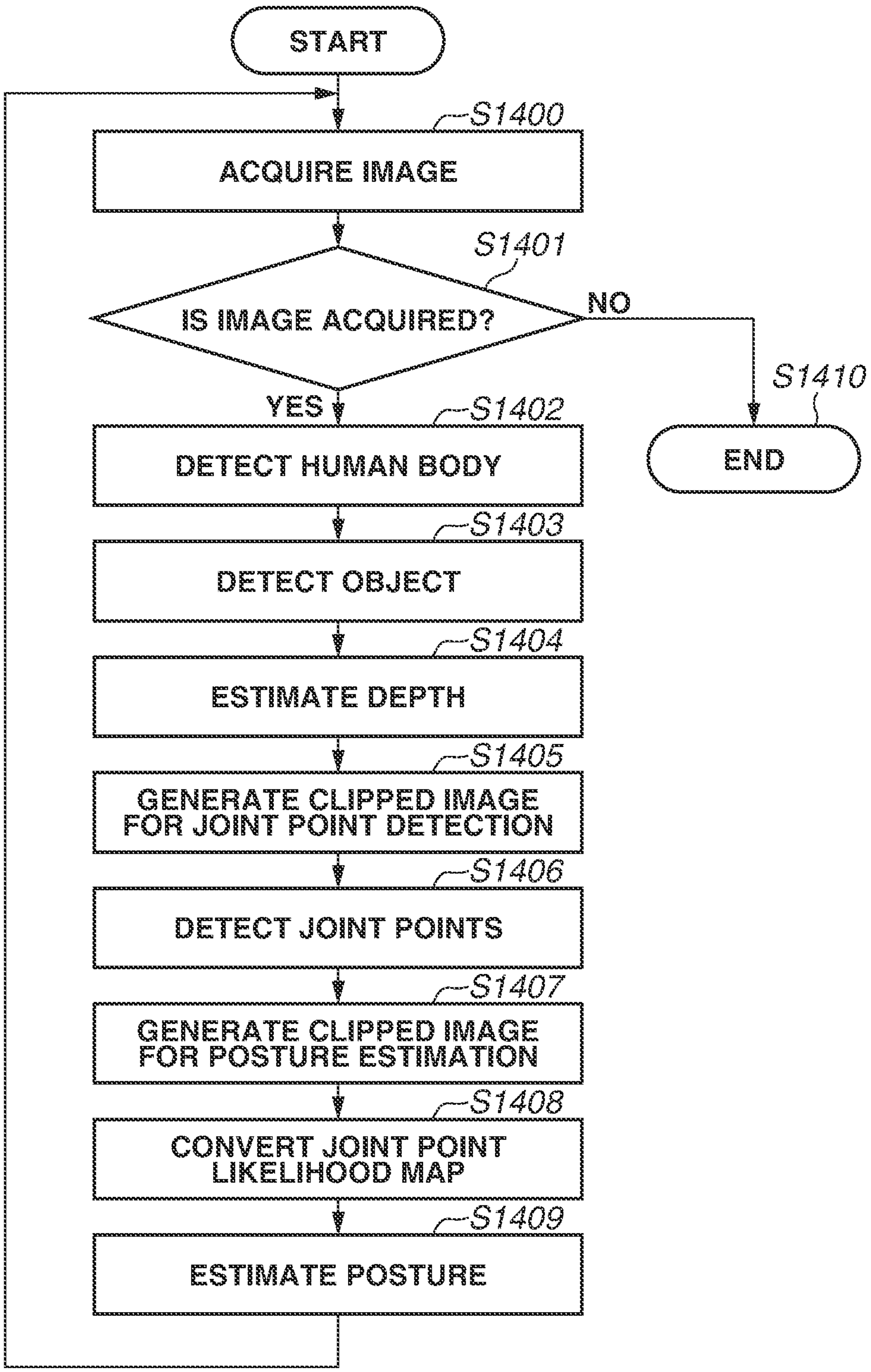
FIG. 14 is a flowchart illustrating an example of a processing procedure for estimating a posture according to the second embodiment.

Now, processing performed by the image processing apparatus 1000 according to the present embodiment is described with reference to the flowchart in FIG. 14. FIG. 14 is a flowchart illustrating an example of a processing procedure for estimating a posture by the image processing apparatus 1000 according to the present embodiment.

First, processing in steps S1400 to S1402 and S1410 are respectively similar to the processing in steps S1000 to S1002 and S1008 in FIG. 10 described in the first embodiment. Next, in step S1403, the object detection unit 207 detects an object from the acquired image. Then, in step S1404, the depth estimation unit 208 estimates the depth of the imaging environment from the acquired image and generates depth information. Processing in steps S1405 and S1406 are respectively similar to the processing in steps S1003 and S1004 in FIG. 10.

Then, in step S1407, the image generation unit 203 generates the clipped image for posture estimation based on the image, the human body detection results, the object detection result, and the depth information. In the processing, the clip region for posture estimation is calculated by a procedure similar to the procedure in the first embodiment, and the clip region is then corrected by the above-described procedure. Then, the image is clipped based on the corrected clip region for posture estimation to generate the clipped image for posture estimation. The image generation unit 203 also generates the image generation information.

Then, in step S1408, the conversion unit 205 converts the joint point likelihood map generated in step S1406 into the joint point likelihood map for posture estimation by using the image generation information generated in step S1407, and connects the depth information. Processing in step S1409 is similar to the processing in step S1007 in FIG. 10. Then, the processing returns to step S1400.

As described above, according to the present embodiment, the clip region for posture estimation is corrected based on the depth map. Therefore, a posture can be estimated with higher accuracy base on an image not horizontal to the floor surface due to distortion of the lens and inclination of the camera. Further, the clip region for posture estimation is corrected so as to include the object region relating to the person. As a result, the important information such as information on a peripheral object is included in the clipped image for posture estimation, which makes it possible to estimate the posture with higher accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims. Each of the embodiments of the invention described above can be implemented solely or as a combination of a plurality of the embodiments. Also, features from different embodiments can be combined where necessary or where the combination of elements or features from individual embodiments in a single embodiment is beneficial.

This application claims the benefit of Japanese Patent Application No. 2023-071680, filed Apr. 25, 2023, which is hereby incorporated by reference herein in its entirety.

What is claimed is:

1. An image processing apparatus, comprising:

at least one processor; and a memory coupled to the at least one processor, the memory storing instructions that, when executed by the at least one processor, cause the at least one processor to:

detect a region of a human body from an image;

detect a visible detection frame including a visible region of the human body, and an invisible detection frame including the visible region and an invisible region of the human body;

generate, from the image, a first clipped image based on a position and a size of the visible detection frame and a second clipped image different from the first clipped image and based on a position and a size of the invisible detection frame;

detect joint points of the human body from the first clipped image to generate joint point information on the human body;

convert the joint point information so as to have spatial information coincident with spatial information on the second clipped image; and estimate a posture of the human body based on the converted joint point information and the second clipped image.

2. The image processing apparatus according to claim 1, wherein the joint point information is a map indicating positions of joint points as likelihood, and wherein the instructions cause the at least one processor to convert the map into a map having spatial information coincident with the spatial information on the second clipped image by performing at least one type of conversion processing among types of conversion processing of rotation, resizing, and addition of margins, on the map.

3. The image processing apparatus according to claim 1, wherein the instructions cause the at least one processor to convert the joint point information into information having a weight assigned to each of the detected joint points.

4. The image processing apparatus according to claim 1, wherein the instructions cause the at least one processor to estimate the posture of the human body by using a deep learning model including a first feature extraction layer configured to output a first feature amount from the converted joint point information, a second feature extraction layer configured to output a second feature amount from the second clipped image, a connected layer configured to connect the first feature amount and the second feature amount, and an identification layer configured to estimate a posture based on the connected feature amounts.

5. The image processing apparatus according to claim 1, wherein the instructions cause the at least one processor to:

detect the region of the human body by rotating the image; and generate the first clipped image from the image rotated by a rotation amount at which the region of the human body is detected.

6. The image processing apparatus according to claim 1, wherein the instructions cause the at least one processor to:

estimate a depth of an imaging environment from the image; and convert the joint point information based on the estimated depth.

7. The image processing apparatus according to claim 1, wherein the instructions cause the at least one processor to:

estimate a depth of an imaging environment from the image; and generate the second clipped image based on the estimated depth.

8. An image processing apparatus, comprising:

at least one processor; and a memory in communication with the at least one processor, the memory storing instructions that, when executed by the at least one processor, cause the at least one processor to:

detect a region of a human body from an image;

detect regions of objects from the image;

generate, from the image, a first clipped image including the region of the human body and a second clipped image different from the first clipped image and including the region of the human body, the second clipped image being generated so as to include a region of an object relating to the human body among the detected regions of the objects;

detect joint points of the human body from the first clipped image to generate joint point information on the human body;

convert the joint point information so as to have spatial information coincident with spatial information on the second clipped image; and estimate a posture of the human body based on the converted joint point information and the second clipped image.

9. A method of controlling an image processing apparatus, the method comprising:

detecting a region of a human body from an image;

detect a visible detection frame including a visible region of the human body, and an invisible detection frame including the visible region and an invisible region of the human body:

generating, from the image, a first clipped image based on a position and a size of the visible detection frame and a second clipped image different from the first clipped image and based on a position and a size of the invisible detection frame;

detecting joint points of the human body from the first clipped image to generate joint point information on the human body;

converting the joint point information so as to have spatial information coincident with spatial information on the second clipped image; and estimating a posture of the human body based on the converted joint point information and the second clipped image.

10. A non-transitory computer-readable storage medium storing computer-executable instructions for causing a computer to execute a method comprising:

detecting a region of a human body from an image;

detecting a visible detection frame including a visible region of the human body, and an invisible detection frame including the visible region and an invisible region of the human body;

generating, from the image, a first clipped image based on a position and a size of the visible detection frame and a second clipped image different from the first clipped image and based on a position and a size of the invisible detection frame;

detecting joint points of the human body from the first clipped image to generate joint point information on the human body;

converting the joint point information so as to have spatial information coincident with spatial information on the second clipped image; and estimating a posture of the human body based on the converted joint point information and the second clipped image.

11. The image processing apparatus according to claim 8, wherein the joint point information is a map indicating positions of joint points as likelihood, and wherein the instructions cause the at least one processor to convert the map into a map having spatial information coincident with the spatial information on the second clipped image by performing at least one type of conversion processing among types of conversion processing of rotation, resizing, and addition of margins, on the map.

12. The image processing apparatus according to claim 8, wherein the instructions cause the at least one processor to convert the joint point information into information having a weight assigned to each of the detected joint points.

13. The image processing apparatus according to claim 8, wherein the instructions cause the at least one processor to estimate the posture of the human body by using a deep learning model including a first feature extraction layer configured to output a first feature amount from the converted joint point information, a second feature extraction layer configured to output a second feature amount from the second clipped image, a connected layer configured to connect the first feature amount and the second feature amount, and an identification layer configured to estimate a posture based on the connected feature amounts.

14. The image processing apparatus according to claim 8, wherein the instructions cause the at least one processor to:

detect the region of the human body by rotating the image; and generate the first clipped image from the image rotated by a rotation amount at which the region of the human body is detected.

15. The image processing apparatus according to claim 8, wherein the instructions cause the at least one processor to:

estimate a depth of an imaging environment from the image; and convert the joint point information based on the estimated depth.

* * * * *